Nov. 7, 1961  C. S. TALLMAN  3,007,371
MICROSCOPES
Filed June 20, 1958

INVENTOR
CHARLES S. TALLMAN
BY
Herbert C. Kimball
ATTORNEY

United States Patent Office 3,007,371
Patented Nov. 7, 1961

3,007,371
MICROSCOPES
Charles S. Tallman, Grand Island, N.Y., assignor to American Optical Company, Southbridge, Mass., a voluntary association of Massachusetts
Filed June 20, 1958, Ser. No. 743,376
3 Claims. (Cl. 88—39)

This invention relates to an improvement in the binocular observation of an object, the two images being formed by light which is polarized.

For binocular observation of an object, it is customary to use a beam splitting device which directs part of the image forming rays to one eye and part to the other eye of the observer. As this light is linearly polarized, the intensity of the reflected rays relative to the transmitted rays depends upon the angle between the normal to the beam splitting surface and the electric vector of the linearly polarized light. Differential changes in intensity are caused, for instance, by the rotation of the analyzer of a polarizing microscope which alters the above mentioned angle of the electric vector. Now, if the intensity of the image received by one eye is materially greater than the intensity of the image received by the other eye, the effect is noticeable and disconcerting. In general, if the intensity variation between the two eyes is more than ten percent, the effect is objectionable.

It is an object of the present invention to so modify the polarized light before it is split by the beam splitting device that the above disadvantage is overcome. This I accomplish by introducing a quarter wave retardation plate between the analyzer and the beam splitting device and maintaining an optic axis of the retardation plate at 45 degrees to the axis of polarization of the analyzer, with the effect that the linearly polarized light leaving the analyser is converted into circularly polarized light before it reaches the beam splitting device.

Figure 1:
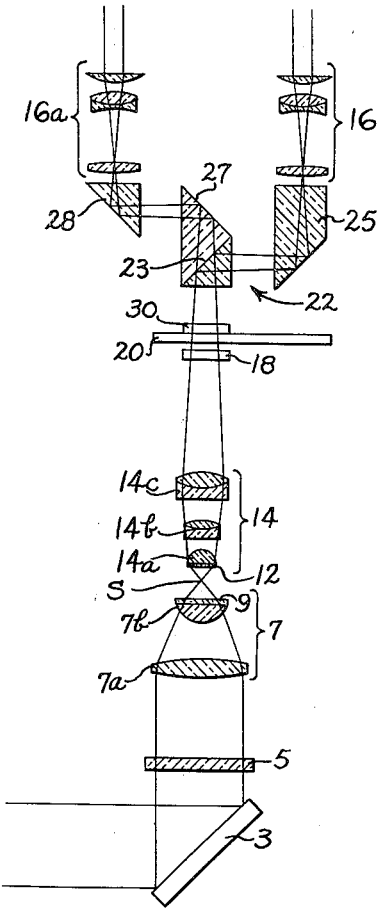
Figure 2:
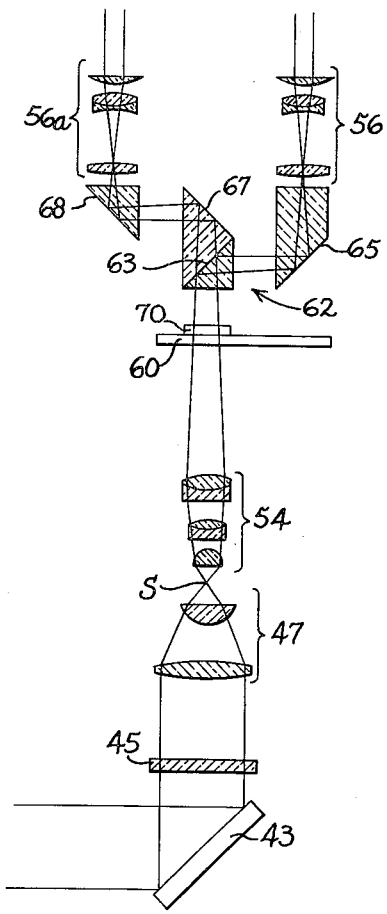

In FIG. 1 is shown diagrammatically an application of my invention to an interference microscope of the polarizing type, and In FIG. 2 is shown diagrammatically a second embodiment of my invention as applied to a polarizing microscope.

The interference microscope illustrated in FIG. 1 is essentially the combination of a polarizing microscope and a two-beam interferometer. The light which is received from a suitable light source (not shown) is reflected along the axis of the microscope by a mirror 3; and this light passes through a polarizer 5 which transmits linearly polarized light to the condenser 7 having the condenser elements 7a and 7b. To the upper or exit surface of the upper condenser element 7b is applied a double refracting plate 9 which divides the light into two beams. The orientation of the polarizer 5 relative to the plate 9 or vice versa is such that light polarized at 45° to the axis of the double-refracting plate 9 is presented to the latter, with the result that the plate 9 separates the polarized light into two beams which are plane polarized at right angles to each other.

The specimen is supported at S. One of the polarized beams passes through the specimen and undergoes a relative phase change dependent upon the optical path difference between the specimen and its surround. The other polarized beam focuses above or to one side of the specimen focus.

To recombine the two beams, a second plate 12 is applied to the lower or entrance surface of the microscope objective 14. In the embodiment shown the objective 14 is made up of three members 14a, 14b and 14c. The double refracting plate 12 applied to the lower face of member 14a recombines the two beams as they enter the objective 14, and an image made up of two oppositely polarized beams is brought toward a focus in the microscope eyepieces 16 and 16a.

Intermediate the objective and the eyepieces are disposed the means 18 (as disclosed herein it is a quarter wave plate) for changing the two oppositely polarized beams into counter-rotating, circularly polarized light, and the analyzer 20. The resultant of the change of the two oppositely polarized beams by the plate 18 into counter-rotating, circularly polarized light is linearly polarized light. The orientation of the linearly polarized light depends on the phase difference between the circularly polarized beams. The analyzer 20 permits determination of this orientation, and also permits selection of the color contrast (due to phase difference) in the image observed should the illumination be white light, or selection of the dark-to-bright contrast should the illumination be monochromatic, or properly filtered light.

As is conventional in binocular microscopes, the light is divided between the two eyepieces. As shown in FIG. 1 a beam splitter 22 directs part of the light to one eyepiece 16 and another part to the other eyepiece 16a. The usual semi-reflecting surface 23 cooperates with a reflecting prism 25; and the light transmitted by surface 23 is directed by a reflecting surface 27 to a reflecting prism 28. Reflecting prisms 25 and 28 are respectively aligned with eyepieces 16 and 16a.

The interference microscope thus far described is well known. In accordance with my invention I introduce into this known microscope a quarter wave plate as shown at 30 between the analyzer 20 and the beam splitter 22. In order that an optic axis of the plate 30 may be constantly at 45 degrees to the axis of polarization of the analyzer 20, it is preferable to mount the retardation plate 30 on the analyzer which causes the plate to rotate with the analyzer.

Assuming that monochromatic or properly filtered light of a selected wavelength has been used for the illumination of the specimen, a retardation plate 30 is used which has been designed for the selected wavelength. The effect of the plate 30 is that the linearly polarized light transmitted by plate 18 and oriented by the analyzer 20 is converted by plate 30 into circularly polarized light.

The advantage of causing circularly polarized light to impinge upon the reflecting surfaces of the beam splitter, these surfaces being at an angle of 45° to the light path, is that the characteristics of this circularly polarized light do not change with rotation of the analyzer 20. Accordingly, there is no variation in the relative intensity of the beams entering the two eyepieces 16 and 16a.

In FIG. 2 I have shown my invention applied to a binocular polarizing microscope. In this optical system the separation into two beams by means of double refracting plates is lacking. The light, as before, which is received from a suitable light source and reflected along the axis of the microscope by a mirror 43 is altered by a polarizer 45 to linearly polarized light. This polarized light is converged by the condenser 47 upon the specimen S. The objective 54 of the microscope is of such focal length that an image of the specimen S is formed in each eyepiece 56 and 56a. The usual analyzer is provided at 60 for varying the light which is transmitted to the eyepieces. As is conventional in binocular microscopes, the light is divided between the two eyepieces. As shown in FIG. 2 there is a beam splitter 62 with semi-reflecting surface 63 and reflecting surface 67. As in FIG. 1, there is a reflecting prism 65 for eyepiece 56 and a reflecting prism 68 for eyepiece 56a.

The polarizing microscope of which an illustrative form is shown schematically in FIG. 2, has linearly polarized light throughout the optical system from the specimen to the analyzer. To obtain the advantages of my invention, the linearly polarized light transmitted by the analyzer is converted to circularly polarized light by a quarter-wave retardation plate 70. Preferably the plate 70 is mounted in the same manner as plate 30 and arranged to turn with the analyzer 60. Again assuming that monochromatic or properly filtered light of a selected wavelength has been used for illumination of the specimen, a retardation plate 70 is used which has been designed for the selected wavelength.

The advantages of my invention in the polarizing microscope are the same as in the interference microscope in that no change in intensity occurs in the light reflected by the surfaces of the beam splitter as the analyzer is rotated. Thus the objectionable variation in intensity between the two eyes does not occur. Moreover, in the case of the interference microscope, the alteration to circularly polarized light occurs after the light paths have been compared for accurate measurement of characteristics of the sample or specimen. Thus the accuracy of the instrument is not affected.

I claim:

1. In a binocular microscope having a polarizer for directing exclusively linearly polarized light rays toward a specimen to be examined, a condenser for focusing said linearly polarized light rays on said specimen, an objective for focusing said linearly polarized light rays coming from said specimen for producing an image of said specimen, a pair of eyepieces for binocular observation of the image produced by said objective, a beam splitter for dividing said focused light rays from said objective and directing same toward said pair of eyepieces, an analyzer disposed in the path of the focused light rays between said objective and said beam splitter and angularly adjustable relative to the focused light rays from said objective for controlling the linearly polarized light transmitted toward said beam splitter, and a quarter wave retardation plate mounted on the side of the analyzer toward said beam splitter, said quarter wave plate being mounted to rotate with said analyzer with an optic axis of said wave plate constantly at 45° to the axis of polarization of said analyzer, whereby substantially all of the light transmitted by said analyzer to said beam splitter will be circularly polarized.

2. In a binocular microscope having a polarizer for directing exclusively linearly polarized light rays toward a specimen to be examined, a condenser for focusing said linearly polarized light rays on said specimen, an objective for focusing said linearly polarized light rays coming from said specimen for producing an image of said specimen, a pair of eyepieces for binocular observation of the image produced by said objective, a beam splitter for dividing said focused light rays from said objective and directing same toward said pair of eyepieces, an analyzer disposed in the path of the focused light rays between said objective and said beam splitter, said analyzer being mounted to rotate about an axis disposed in substantially parallel relation to the light rays from said objective so as to be angularly adjustable relative thereto for controlling the linearly polarized light transmitted toward said beam splitter, and a quarter wave retardation plate mounted on the side of the analyzer toward said beam splitter, said quarter wave plate being mounted to rotate with said analyzer with an optic axis of said wave plate constantly at 45° to the axis of polarization of said analyzer, whereby substantially all of the light transmitted by said analyzer to said beam splitter will be circularly polarized.

3. In a binocular interference microscope having a polarizer for supplying exclusively linearly polarized light rays for illumination of the specimen to be examined, a condenser for focusing said linearly polarized light on said specimen, a double refracting plate for dividing the polarized light focused by said condenser into two beams, an objective for focusing said linearly polarized light rays to produce an image of said specimen, a double refracting plate cooperating with said objective for recombining said light rays into two oppositely polarized beams to produce said image, a quarter wave plate interposed in said recombined light rays for changing the oppositely polarized beams into linearly polarized light rays, a pair of eyepieces for binocular observation of said image, a beam splitter for dividing said focused light rays between said pair of eyepieces an analyzer for determining the orientation of said linearly polarized light, and a quarter wave retardation plate mounted on said analyzer with an optic axis thereof constantly at 45 degrees to the axis of polarization of said analyzer whereby substantially all of the light transmitted by said analyzer to said beam splitter is circularly polarized.

References Cited in the file of this patent

UNITED STATES PATENTS

| | | |
|---|---|---|
| 2,182,142 | Ball et al. | Dec. 5, 1939 |
| 2,192,295 | Berek | Mar. 5, 1940 |
| 2,255,631 | Schulman | Sept. 9, 1941 |
| 2,449,287 | Flood | Sept. 14, 1948 |
| 2,487,063 | Marks | Nov. 8, 1949 |